United States Patent
Dunlap

[15] 3,659,649
[45] May 2, 1972

[54] METHOD OF STIMULATING OIL OR GAS RESERVOIRS BY A SUBSURFACE NUCLEAR EXPLOSION

[72] Inventor: Henry F. Dunlap, Dallas, Tex.
[73] Assignee: Atlantic Richfield Company, Philadelphia, Pa.
[22] Filed: May 27, 1968
[21] Appl. No.: 732,401

[52] U.S. Cl. ............................................166/247, 176/39
[51] Int. Cl. .........................................................E21b 43/00
[58] Field of Search ........................176/39, DIG. 4; 166/247

[56] References Cited

UNITED STATES PATENTS

| | | | |
|---|---|---|---|
| 3,214,343 | 10/1965 | Natland | 176/39 X |
| 3,219,537 | 11/1965 | Tanner et al. | 166/247 X |
| 3,236,239 | 2/1966 | Lange et al. | 176/39 |
| 3,262,857 | 6/1966 | Schlicht et al. | 176/39 |
| 3,341,424 | 9/1967 | Schlicht et al. | 176/39 |

FOREIGN PATENTS OR APPLICATIONS

| | | | |
|---|---|---|---|
| 696,051 | 10/1964 | Canada | 176/39 |
| 696,052 | 10/1964 | Canada | 176/39 |
| 984,594 | 2/1965 | Great Britain | 176/39 |

*Primary Examiner*—Reuben Epstein
*Attorney*—Norbert E. Birch and Blucher S. Tharp

[57] ABSTRACT

A nuclear explosive device for subsurface use is assembled and detonated through a small diameter borehole by enlarging a section of the borehole to a sufficient size, lowering a triggering device into the enlarged section and placing nuclear explosive fuel material around the trigger. The nuclear fuel material is surrounded by a second material which may be of higher density and may also be a fuel material. Heavy water may be injected into or with the nuclear fuel material. The nuclear fuel material may contain the deuteride of an active metal substance and be slurried with an anhydrous liquid; or it may contain the heavy hydrogen isotope of the hydroxide of the active metal substance and be slurried with heavy water. Concentric collapsible, expansible containers are used to form the nuclear explosive.

12 Claims, 4 Drawing Figures

Patented May 2, 1972

INVENTOR
Henry F. Dunlap

BY Blucher S. Sharp

Attorney

INVENTOR
Henry F. Dunlap
BY Blucher S Sharp
Attorney

METHOD OF STIMULATING OIL OR GAS RESERVOIRS BY A SUBSURFACE NUCLEAR EXPLOSION

BACKGROUND OF THE INVENTION

This invention relates to subsurface nuclear explosions for simulating oil or gas reservoirs, for creating large underground storage or disposal spaces, or for assisting in underground recovery of minerals or hydrocarbons. More specifically, this invention pertains to assembling a large yield, subsurface nuclear explosive device through a borehole having a diameter less than the lateral cross section of the nuclear explosive device.

This invention is primarily directed to those already possessing knowledge of how to construct a nuclear explosive device, for example, an atom or hydrogen fusion or fission bomb; and except as noted herein and as required to be modified to fit this invention, this invention employs the methods of construction, the nuclear fuel materials and the nuclear triggers that are presently used in nuclear explosive devices by the United States government.

Generally, it is well-known that a nuclear triggering device can cause a certain mass of some atomic nuclei to undergo nuclear fission (for example, the splitting of uranium 235 or plutonium 239 in a critical mass), or thermonuclear fusion (for example, fusion of deuterium or tritium in a solid compound form such as lithium-6-deuteride to form helium), or both fission and fusion to spontaneously produce an enormous amount of energy by what is commonly referred to as a nuclear explosion.

The nuclear explosive device is, therefore, mainly composed of a nuclear triggering system surrounded by a fissionable or fusible nuclear fuel material. The triggering device, which is much smaller than the overall nuclear explosive device, produces the heat and neutrons necessary to accomplish nuclear reaction of the nuclear fuel material and produce the explosion. Typically, the triggering device and nuclear fuel material are encased in a cylindrically-shaped cannister so that the nuclear explosive device has a determinable lateral cross section or diameter. With presently available nuclear explosive devices, it is estimated that the lateral diameter of the cannister will be about 13 inches for a 10 kiloton device, 19 inches for a 100 kiloton device, 21 inches for a 300 kiloton device and 24 inches for a megaton device. Older nuclear explosive devices had even larger diameters. For example, in an early test, a few kiloton devices had a diameter of 30 inches while, in a more recent test, a 5 kiloton device had a cannister diameter of about 12 inches and a length of 4 feet.

Because nuclear explosions economically develop an extremely large amount of energy, many subsurface uses for these nuclear explosions have been proposed. Most applications involving subsurface nuclear explosions require large diameter emplacement boreholes and it is required that the well be cased as a safety precaution to placing the nuclear explosive device. Even in relatively shallow boreholes, there are many difficulties encountered in drilling and casing large diameter boreholes and the costs to drill and case these holes is a major factor in the economic use of nuclear explosives. For deeper applications such as stimulating oil or gas reservoirs, for creating large underground storage or disposal spaces, or for assisting in underground recovery of minerals or hydrocarbons by other in situ methods, the cost of each kiloton of yield of a nuclear explosive decreases as the overall yield is increased. It is, therefore, preferred to use as large a yield nuclear explosive as is practical; for example, a yield equivalent to a hundred kilotons of trinitrotoluene (TNT) to a yield of a few megatons. Unfortunately, as previously indicated, the diameter of these large yield devices requires a large diameter borehole. Moreover, large yield devices, being long and wide, are more dangerous and difficult to run in an uncased borehole. As a result, even though the economics are such that it is desirable to use large yield explosives in deep boreholes, the costs and difficulties encountered in drilling and casing deep, large diameter boreholes for the large yield devices is such as to dominate the economic use of large yield nuclear devices in deep boreholes.

Accordingly, it is desirable to provide a system for creating subsurface nuclear explosions that reduces the required borehole diameter and which could eliminate the need for running casing. The desirability of reducing hole size and eliminating casing becomes greater when the yield of the nuclear explosive device is increased or when the nuclear explosive is to be placed deeper in the earth. It has been proposed that there be sponsored development of special, small diameter nuclear bombs that may be lowered through smaller diameter boreholes. This solution would also require development of new triggering devices and would result in a longer explosive which would be more difficult to run in anything but a cased hole. A long cylindrical explosive has the additional disadvantage of being inherently less efficient in using the heat and neutrons produced by the triggering device and in the subsequent explosive reaction of the nuclear fuel. A nearly spherical shape for the explosive with the trigger at the center is optimum if maximum explosive yield per kilogram of nuclear material used is to be achieved. In contrast, this invention discloses a different solution for placing nuclear devices adjacent a selected subsurface formation through a borehole. This solution is applicable to any yield nuclear explosive device and to any depth borehole, and is especially advantageous for deep boreholes and large nuclear explosive devices. The desirable, approximately spherical geometry for the explosive is readily achieved by the method described. This invention, moreover, uses standard already available nuclear triggering devices and is limited only by the size of the triggering device which is smaller than the overall nuclear explosive device.

It is also desirable to either eliminate the need for casing the borehole, or, in the alternative, to greatly reduce the length of casing required. This invention provides a system for either eliminating the casing or reducing the amount of casing needed.

SUMMARY OF THE INVENTION

This invention relates to a method for stimulating oil or gas reserves, for creating large underground storage or disposal spaces, or for assisting in underground recovery of minerals or hydrocarbons by assembling and detonating a nuclear explosive device in a subsurface formation through a borehole which has a lateral cross section less than the lateral cross section of the nuclear explosive device. The method is supplemented with apparatus for assembling the nuclear explosive and with a nuclear fuel slurry for use in the method. In addition, there is shown an explosive device in a preferred arrangement.

More specifically, the method involves enlarging a section of a borehole adjacent a selected formation to form a cavity. The cavity is measured to determine if the cavity will hold the nuclear explosive device and to determine the location for the nuclear explosive device in the cavity. Thereafter, a nuclear triggering device is lowered into the cavity to the desired location. A nuclear fuel material is placed around the nuclear triggering device. The nuclear fuel material usually contains an active metal element in either elemental or reacted form. The amount of nuclear fuel material so placed is sufficient to form a nuclear explosive device which has a lateral cross section greater than the diameter of the borehole. A second material is placed around the nuclear fuel material. The nuclear triggering device is then activated to detonate the nuclear explosive device.

This method reduces the required borehole diameter to correspond to the size of the nuclear trigger which has a size much less than the size of the nuclear explosive device. In addition, the trigger is of relatively low yield as compared to the nuclear explosive device; for example, a 10 kiloton yield trigger could be used for an explosive device having a yield equivalent to hundreds of kilotons of TNT.

As a result, in this method, the trigger being smaller and relatively low in yield could be safely lowered through an uncased borehole if of low enough yield, or in the alternative, the borehole only need be cased to a relatively shallow depth at which the trigger could not crater at the surface if accidentally fired. In either event, the amount of casing required is substantially reduced.

A heavy material, which has a specific gravity greater than the specific gravity of the nuclear fuel material around the trigger, may be placed to surround the nuclear fuel material. This heavy material may also be an active fuel material. During the early stages of the explosion, this heavy material helps to hold the nuclear explosive device together and contain the nuclear fuel material. Later this heavy material, if it is fissionable, may contribute to the yield of the explosion.

Placement of the nuclear fuel material around the nuclear trigger and prevention of contamination of the nuclear fuel material may be assisted by injecting a noncontaminating liquid through the nuclear fuel material to displace contaminating fluids or by forming a slurry of nuclear fuel material and a compatible liquid. For example, the noncontaminating liquid may be heavy water, or the nuclear fuel material may contain the deuteride of the active metal substance and be slurried with an anhydrous liquid, or the nuclear fuel material may contain a heavy hydrogen isotope of the hydroxide of the active metal substance and be slurried with heavy water. The anhydrous liquid will preferably be a liquid having all of the hydrogen replaced by deuterium, or will be replaced by such a liquid. Preferably, the nuclear trigger is placed in a first collapsed expansible container and nuclear fuel material is placed in the container to surround and expand the container. The first container is surrounded by a second collapsed expansible container. The heavy material will be placed inside this second container to surround the first container and expand the second container. Additional concentric, expansible sections may be used to provide an onion-skin type structure of several layers if desired. In addition, the container may be designed to form an essentially spherical-shaped nuclear explosive device. This invention provides an apparatus for assembling a nuclear explosive in this manner. The apparatus is comprised of at least two collapsible and expansible containers with the first container inside the second container. The first container is adapted to receive the nuclear triggering device and nuclear fuel material, and the second container is adapted to receive a second heavy fuel material. In order that a noncontaminating liquid may be forced through the containers or a fuel material slurry may be forced or pumped into the containers, each container may have an outlet designed to pass liquid and screen out nuclear fuel particles.

The explosive device formed in this preferred manner will be comprised of a nuclear triggering device surrounded by a nuclear fuel material which fuel material is in turn surrounded by the walls of a first container. The first container will be surrounded by a second denser material which is surrounded by a second container. The nuclear triggering device will be connected to means for activating the trigger.

BRIEF DESCRIPTION OF THE DRAWINGS

The drawings are merely illustrative of four ways of forming a nuclear explosive device through a borehole having a cross section smaller than the cross section of the nuclear explosive device.

DESCRIPTION OF PREFERRED EMBODIMENTS

This invention pertains for stimulating oil or gas reserves, for creating large underground storage or disposal spaces, for assisting in underground recovery of minerals or hydrocarbons by assembling a large yield, subsurface nuclear explosive device through a borehole having a diameter less than the lateral cross section of the nuclear explosive device. This is accomplished by downhole assembly of a nuclear explosive device including a nuclear triggering device surrounded by fissionable or fusible nuclear fuel material. The nuclear explosive is assembled in an enlarged section of a borehole. The borehole may be just large enough to receive the nuclear triggering device and the apparatus used to assemble the nuclear device. Except as limited by claims hereto, this invention is not limited to any particular apparatus since there are available to the petroleum industry many devices for downhole operations which with minor modification could be used for downhole construction of a nuclear device in accordance with this disclosure.

In order to illustrate how some of the known techniques and devices are to be modified to accomplish the essential elements of this invention, four simplified figures will be used to illustrate apparatus for this purpose.

It is to be further understood that this invention is primarily directed to those already possessing knowledge of how to construct a nuclear explosive device and, except as required to be modified to use in this invention, the nuclear fuel materials and nuclear triggering devices are those that are presently used in nuclear explosive devices by the United States government and except for the fact that in two embodiments of this invention the nuclear fuel material is partially limited by the characteristics of a liquid with which the nuclear fuel material is mixed to form a slurry.

Figure 1:
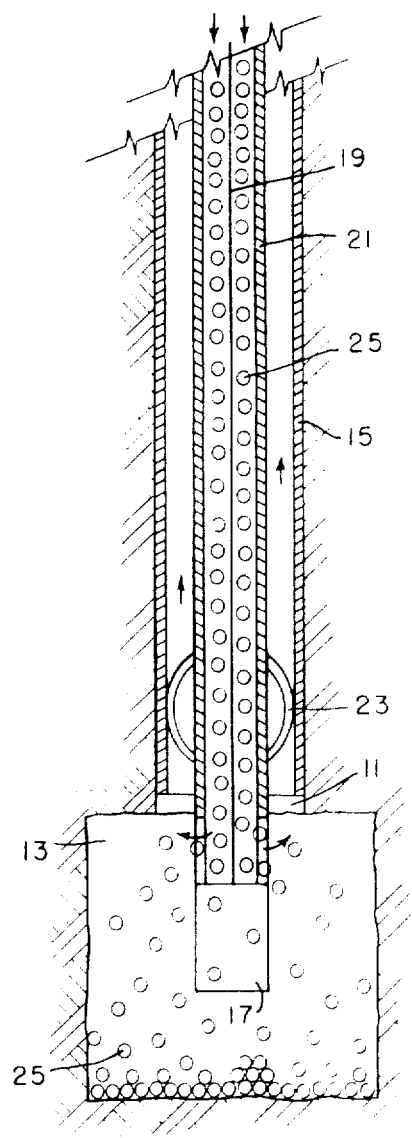
FIG. 1 shows a vertical cross-sectional view of a borehole and nuclear explosive device being formed in an open enlarged section of the borehole.

As mentioned previously, the drawings are merely illustrative of simplified systems for carrying out downhole assembly of a nuclear explosive device. In FIG. 1, there is shown a simple system using a gravel pack technique wherein borehole 11 extends from the surface of earth into an enlarged section of the borehole which forms cavity 13 large enough to hold a nuclear explosive device. The borehole is cased by optional casing 15 which is large enough to permit nuclear trigger 17 to be lowered into cavity 13. The nuclear trigger is attached to or suspended from optional casing 15 or from optional tubing 21 as shown. The trigger will be connected to means for detonating or activating the trigger. For simplicity, the trigger is shown connected to firing cable 19 which extends to the surface and by which the nuclear trigger will be activated. Actually, the cable may be lowered after the nuclear trigger and casing or tubing have been placed. For example, the cable could be connected by an overshot or latching connector which is lowered down the tubing or casing to couple with a receiving connection attached to the trigger. Optional tubing 21 is around the cable and has centralizer 23 near its lower end to hold the tubing and cable in the center of the borehole thereby centering the nuclear trigger in the center of the cavity. As shown, nuclear fuel material 25 passes downward through tubing 21 and fills cavity 13 to surround the nuclear trigger with fuel material.

In operation of all of the systems illustrated, overlying geological formations are penetrated by conventional drilling techniques with access borehole 11 drilled from the surface of the earth into a host formation. Borehole 11 has a diameter significantly smaller than the cross section of the nuclear explosive and is large enough to pass nuclear trigger 17. For example, borehole 11 could have a diameter of 12¼ inches which is large enough to pass a 10 kiloton nuclear trigger, but which would be significantly smaller than the cross section of a megaton nuclear explosive device which the trigger will activate. At a depth where a nuclear explosion is to be created, a section of borehole 11 is enlarged using well-known techniques to form cavity 13. Although cavity 13 is relatively small, it is wide enough and long enough to permit assembly of a nuclear explosive device in the cavity. The nuclear explosive device will have a cross section larger than the diameter of borehole 11. For example, cavity 13 may be formed by jet erosion using abrasive-laden fluids at high pressure with a rotating nozzle, or by use of a chemical explosive followed by bailing out of the rubble, or by expansible mechanical reamers. By way of further example, a 10 foot vertical section of a 12 inch borehole may be under-reamed to 20 inches using a Rotary Oil Tool Company expanding tool number 10 KWA which would be followed by a second expanding tool 10WX28 on the same drill string to expand the enlarged section to 28 inches. An enlarged section of this size would hold a nuclear explosive device having a yield in excess of a hundred kilotons of TNT.

The boundaries of cavity 13 will then be measured using conventional techniques and in a manner accurate enough to determine if the cavity will hold the nuclear explosive device and to determine the location for the nuclear triggering device in the cavity. For example, the cavity may be measured using conventional downhole calipers such as the sonic scanning device known as the Dowell Sonar Caliper.

Thereafter, nuclear triggering device 17 is lowered through borehole 11 and spotted in cavity 13 at the location determined previously. This triggering device will be connected to means for centering the trigger. For example, with reference to FIG. 1, the trigger may be on the lower end of optional casing 15 or on the lower end of optional tubing 21 (as shown) which will have centralizer 21 to center the lower of the tubing.

When the nuclear trigger has been properly located, nuclear fuel material 25 is placed substantially around nuclear triggering device 17. This nuclear fuel material is a fissionable or fusionable material suitable for being activated to undergo nuclear reaction by the nuclear triggering device. The nuclear fuel material will usually contain an active metal element including a metal compound such as uranium 235, lithium deuteride and plutonium 239. The amount of fuel material placed around the trigger is sufficient to form a nuclear explosive having a lateral cross section larger than the diameter or lateral cross section of the borehole. As shown in FIG. 1, nuclear fuel material 25 is placed around nuclear triggering device 17 in pelletized or granulated form. The fuel pellets were slurried with a liquid, such as, heavy water, and pumped down tubing 21 in cavity 13. The fuel pellets settle out of the slurry into the cavity around the nuclear trigger while the liquid from the slurry is either circulated back to the surface by way of the casing-tubing annulus or the liquid may be forced outward into the surrounding host formation. If the fuel pellets have been deposited around the nuclear trigger using a contaminating fluid such as light or conventional water or hydrocarbon, heavy water, that is, water with one or both of the hydrogens replaced by deuterium and exhibiting poor neutron absorbing characteristics or other liquid with hydrogen replaced by deuterium, may be flushed through the fuel pellets to displace the contaminating fluids with a material better suited to increase or maintain the yield of the explosive device. There are many systems for locating granular materials, cements or the like in subsurface zones and any of these systems suitable to this process may be used to locate the fuel material. For example, reference may be had to gravel packing or sand consolidation systems and to well cementing and borehole packing systems.

The nuclear fuel material may contain the deuteride of an active metal substance, for example, lithium deuteride, which deliquesces in water. In this event, the fuel material granules may be coated with a thin metal surface to prevent contact with water. As a further safeguard, the granules may be mixed with an anhydrous liquid, for example, kerosene, to form a flowable slurry which is then forced around the nuclear triggering device to place the fuel particles. The kerosene is then displaced from the granule pore spaces by flushing with heavy water.

Another approach for forming a slurry of fuel material would be to use the heavy hydrogen isotope of the hydroxide of the active metal substance, for example, lithium hydroxide with hydrogen being replaced by deuterium, and mixing this with heavy water to form a flowable slurry.

Once the nuclear explosive has been formed, access borehole 11 will be closed or stemmed to contain the explosion. For example, concrete and sand, and other forms of plugs have been provided in placement holes behind a nuclear explosive device to stem the underground nuclear explosion and prevent up-hole blast. The nuclear explosive is then detonated by activating nuclear triggering device 17 to create a chain reaction which extends through the fuel pellets causing a nuclear explosion.

There has been described the general system and method for creating a nuclear explosion through a borehole having a diameter smaller than the lateral cross section of the nuclear explosive device causing the explosion. This general method has been described in conjunction with FIG. 1 wherein a slurry is used to deposit nuclear fuel material in a cavity around a nuclear trigger. It is much preferred to provide better control of the geometry of the nuclear explosive and of the amount of distribution of nuclear fuel material around the nuclear trigger. As will be described in more detail, this is accomplished by placing the nuclear triggering device in an inflatable or expansible container which is collapsed around the trigger. The nuclear triggering device could be placed in the collapsed container before or after locating the container in cavity 13. The expansible container is designed to expand to the desired shape. Expansion of the container may be accomplished by mechanical means or by filling the container with a flowable material such as a slurry of granulated nuclear fuel material thereby controlling the geometry of the nuclear explosive. A predetermined amount of nuclear fuel material could be located in the tubing or casing above the container and upon operation of suitable means for separating the nuclear fuel material from the interior of the expansible container, for example, valves or rupture disks, the nuclear fuel material would be forced into the container to surround the nuclear triggering device and expand the container. A simple cementing shoe or swab could be used to force the nuclear fuel material downward into the container. The container may be completely sealed from the borehole environment, or, if desired, the container could be provided with outlets to the borehole designed to permit flow of liquid from the interior of the container while preventing flow of fluids from the borehole into the container. This system has the further advantage of excluding undesirable borehole fluids from the fuel material and trigger and permitting placement of dense material around the container. A still more advantageous system includes one or more collapsed, expansible containers around the original container encircling the nuclear trigger. The concentric expansible containers may be expanded and filled in a manner similar to the original container. This concentric system of expansible containers permits the use of separated nuclear fuel materials of different characteristics and density and allows the nuclear explosive device to be formed in layers. In addition to other advantages, this permits surrounding the first container with a material having a specific gravity greater than the specific gravity of the nuclear fuel material in the first container surrounding the trigger. Preferably, this heavier material will also be a nuclear fuel material.

Figure 2:
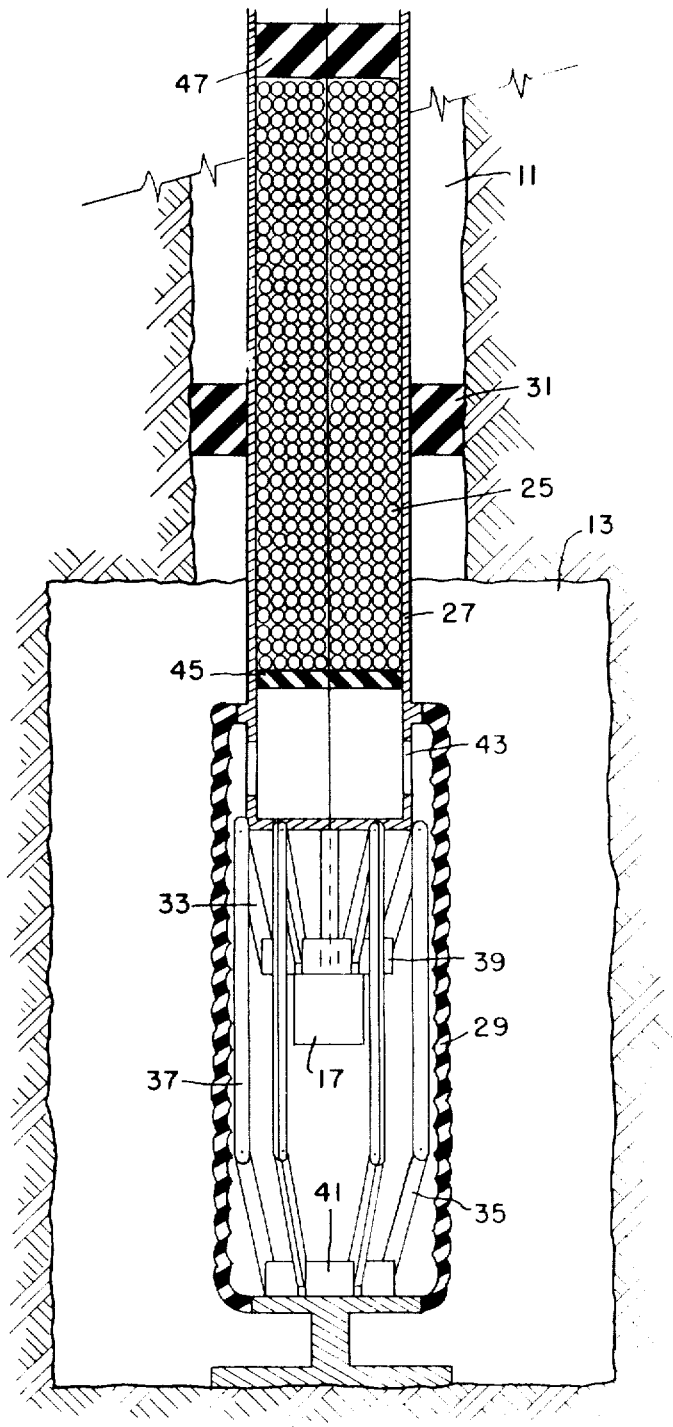
FIGS. 2 and 3 show vertical cross-sectional views of a borehole and nuclear explosive device using expansible containers.

More specifically, reference will now be had to FIG. 2 wherein in borehole 11 and cavity 13, on the lower end of tubing 27 is collapsed, expansible container 29 which surrounds nuclear trigger 17. The tubing is centered in the borehole by packing element 31; for simplicity, the container is shown resting on the bottom of the cavity. Inside the container are mechanical means for expanding the container to a predetermined geometry. Expansion of the container is accomplished through upper expansion members 33 and lower expansion members 35. Corresponding ends of corresponding upper and lower expansion members are pivotably connected to outer vertical members 37 which are in contact with the wall of the expansible container. The other ends of the upper expansion members are pivotably connected to upper circular ring holder 39. In a similar manner, the other ends of the lower expansion members are pivotably connected to lower circular holder 41 in a manner that permits limited rotation of the expansion members on their respective pivots.

Near the lower end of tubing 27 are openings 43 through which nuclear fuel material 25 will pass from the tubing into the container. The nuclear fuel material is separated from the openings by movable lower shoe 45. As shown, for simplicity, lower shoe 45 is sized to fit inside of tubing 27 below openings 43 when the shoe is forced downward so as to not block the openings. Above nuclear fuel material 25 is movable upper shoe 47. As shown, this upper shoe is sized to cover openings 43 when this shoe moves downward and displaces the fuel material into the container.

During operation of the device of FIG. 2, after cavity 13 has been formed and checked, nuclear triggering device 17 is lowered on the bottom of tubing 27 into borehole 11 inside of collapsed, expandable container 29 and the container is set in place on the floor of the cavity. Thereafter, tubing 27 is lowered onto upper expansion members 33 at the same time lowering nuclear triggering device 17 so that when the container is expanded the trigger will be properly located in the expanded container. The weight of the tubing forces the upper expansion members to pivot downward thereby forcing vertical members 37 to cause lower expansion members 35 to also pivot downward. The amount of pivoting is limited and supported by the lower end of the container. This expands container to the desired size and shape. When the container has been expanded, upper movable shoe 47 is forced downward thereby forcing fuel material 25 and lower movable shoe 45 downward. When lower shoe 45 passes openings 43, the fuel material passes through the openings into the container around nuclear triggering device 17.

Figure 3:
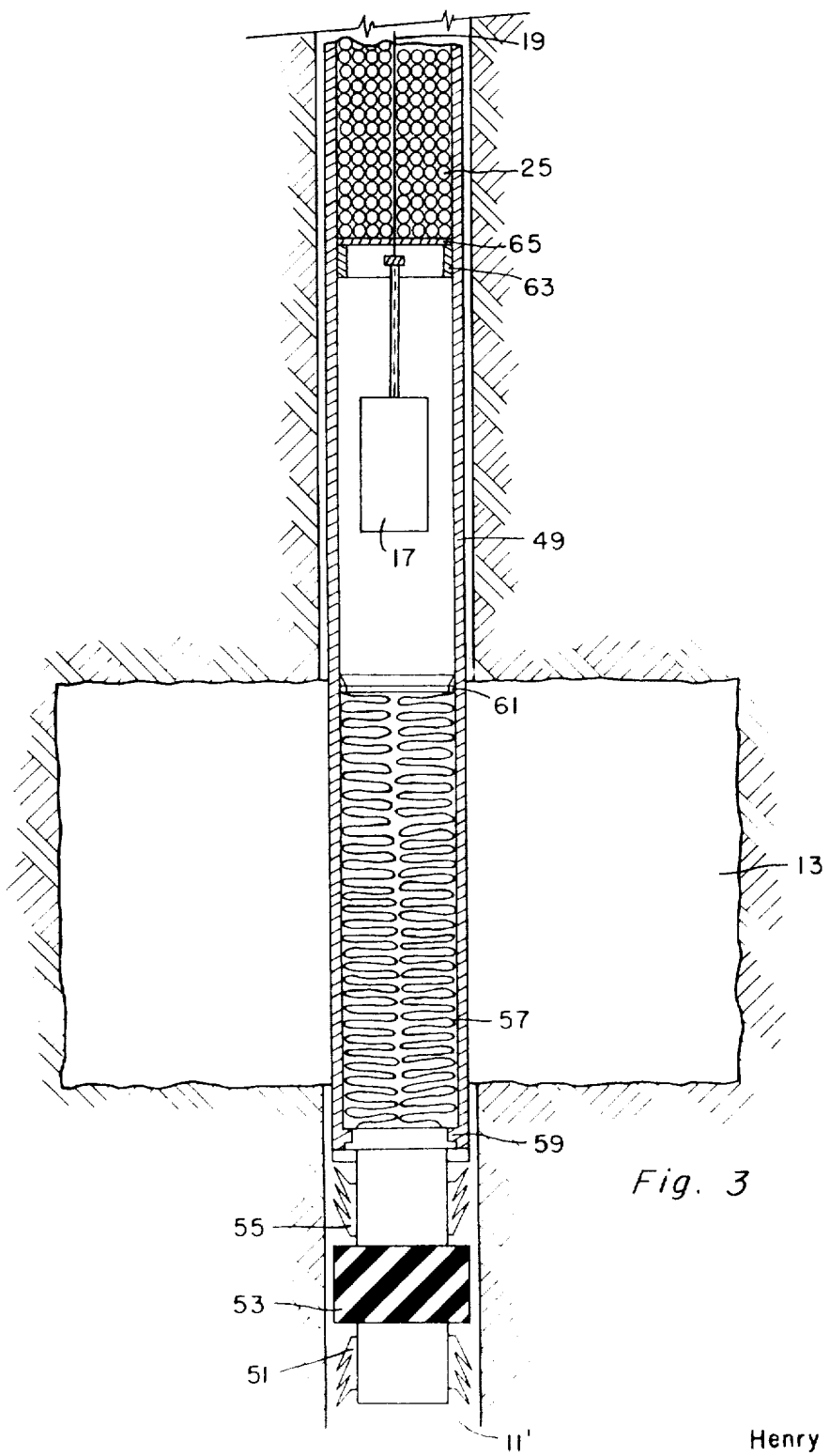

A third system for assembling the nuclear explosive downhole is illustrated in FIG. 3. As shown, borehole 11' passes through cavity 13. On the lower end of casing 49 is depicted a standard hold-down packer having lower friction dogs 51, packer sealing element 53 and upper friction dogs 55. The packer may have a flow passage therethrough with a check valve. Connected to the top of the packer inside the casing is folded expansible container 57. Casing 49 is slidably mounted around the container and has stop 59 near its lower end. On the top of container 57 is stop ring 61 sized slidably mounted to engage stop 59 when casing 49 is raised to release the container as hereinafter described. Above the container, inside of the casing is nuclear trigger 17 which is connected to upper stop ring 63. Resting on this upper stop ring is frangible disk 65 which separates nuclear fuel material 25 from the trigger.

The system of FIG. 3 is used in the following manner to assemble a nuclear explosive device larger than diameter of the borehole. The system shown is lowered into borehole 11' and located as shown relatively to cavity 13. Thereafter, the packer is set by first setting lower friction dogs 51 which prevent further downward movement of the casing. Sealing element 53 is expanded to seal the borehole and upper friction dogs 55 are set. Upper friction dogs 55 prevent upward movement of the packer. When the packer is set, the casing is released from the packer and is pulled upward a predetermined distance to release container 57. When the container is free to expand, nuclear fuel material 25 is forced downward by means not shown, for example, a displacing shoe as used in FIG. 2. This forces upper stop ring 63 downward to engage floating slidable stop ring 61 on the upper end of the container and to in turn engage stop 59 near the raised end of the casing. At the same time, nuclear triggering device 17 is lowered with upper stop ring 63 into proper position within the container. When this upper stop ring can no longer move downward, frangible disk 65 breaks the nuclear fuel material is forced into the collapsed container around the nuclear trigger. This expands the container to the desired size which is greater than the diameter of the borehole. Excess liquids from the slurry of fuel material or flushing fluids may be flowed through the fuel granules and the packer.

Figure 4:
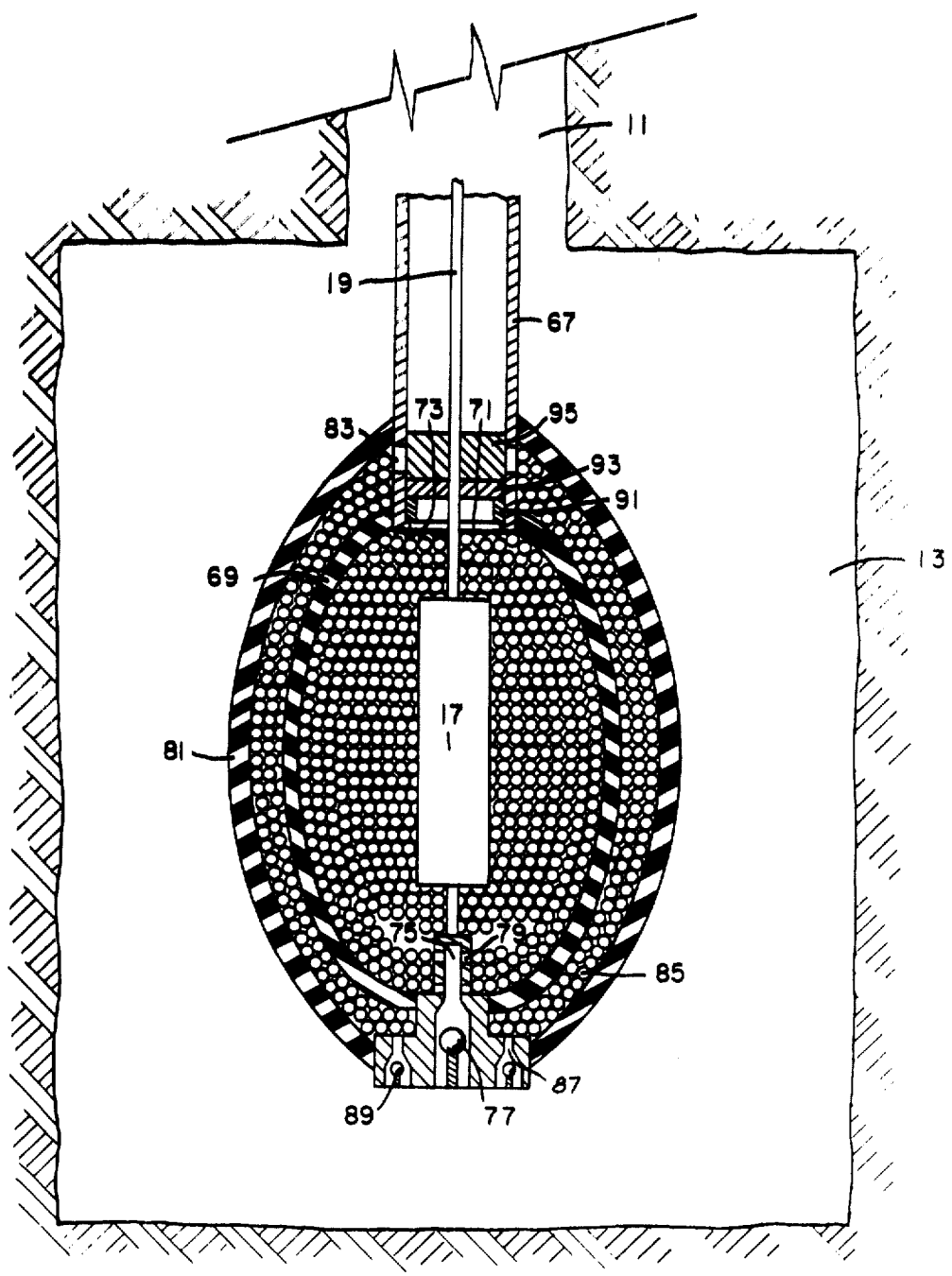
FIG. 4 shows a vertical cross-sectional view of a borehole and a nuclear explosive device using two concentric expansible containers.

FIG. 4 illustrates a nuclear explosive device larger than borehole 11 and having two concentric expanded containers. On the lower end of conduit 67 is first collapsible and expansible container 69 whose top portion is adapted to receive nuclear triggering device 17 which is connected to cable 19 for activating the nuclear triggering device. Cable 19 extends from the trigger out of the first container into conduit 67. This upper end of the first container is also adapted to receive nuclear fuel material 25 through inlet 71 which is in the lower end of the flow conduit. As mentioned previously, the nuclear fuel material or first explosive material substantially surrounds nuclear triggering device 17 and is present in an amount suitable for creating a nuclear explosion. As shown, the lower end of the flow conduit is necked down to provide stop 73. First container 69 also has optional outlet passage 75 which has backflow ball-check valve 77 which allows fluid to flow out of the first container, but prevents flow of borehole fluids into the first container. Outlet passage 75 is adapted to prevent passage of nuclear fuel material 25 from the first container by sizing ports 79 smaller than the granulated fuel material.

Surrounding first container 69 is second collapsible and expansible container 81 whose upper end is adapted to communicate with flow conduit 67, or some other flow conduit, by way of inlet passages 83. Inside the second container is second material 85 which surrounds a major portion of first container 69. This second material has a specific gravity greater than the nuclear fuel material inside the first container. It is preferred that this second material also be a nuclear fuel material suitable for activation by the nuclear trigger and first nuclear fuel material. For example, the first fuel material may be a fuel material rich in deuterium while the second material is rich in a heavier metal fuel. More specifically, the first fuel material may be rich in lithium deuteride while the second fuel material is rich in uranium which has a specific gravity over 15 times that of lithium deuteride.

As in the case of the first container, the second container may have optional outlet passages 87 which have ball-checks 89 adapted to allow fluid to form the second container, but prevent flow of borehole fluids into the second container. Similarly, outlet passages 87 will be sized to prevent granulated second material 85 from passing into the outlets.

It is to be noted that outlets 75 and 87 are strictly optional and are not required unless it is desirable to flush a special liquid, such as, heavy water, or a neutron control liquid, whether setting or non-setting, through the granulated materials.

As shown inside conduit 67, are ring 91, lower spacing shoe 93 and upper spacing shoe 95. All are held in place by stop 73. For simplicity, ring 91 was positioned originally to seal inlet passages 83 leading to second container 81 and prevent first nuclear fuel material 25 from entering the second container. Lower spacing shoe 93 was used to force first nuclear fuel material 25 into the first container and to push the seal ring downward to open inlet passages 83 so that upper spacing shoe 95 could then force second material 85 into the second container and reseal the inlet passages.

Briefly, the nuclear explosive device of FIG. 4 was formed in cavity 13 by lowering and positioning concentric collapsible containers 69 and 81 in the cavity. Nuclear triggering device 17 could be lowered with and inside first container 69 or the trigger could be lowered into the container after it has been positioned. A predetermined size slug of first nuclear fuel material is then placed in the first container to surround the nuclear triggering device and to expand the container to a size having a lateral cross section greater than the diameter of borehole 11. One way to place the first nuclear fuel material is to force lower spacing spacing shoe 93 downward on top of the fuel material. If desired, this first nuclear fuel material could be followed by a special fluid to be flushed into the nuclear fuel material. The separate slugs could be accomplished using frangible separating spacers. After the first nuclear fuel material has been placed, a second denser material is forced through inlet passages into second container 81 to substantially surround the first container and expand container 81. This second material could be so placed using standard downhole valves, or parallel or concentric flow conduits. For simplicity, as shown, placement of the second material was accomplished by forcing lower spacing shoe 93 downward thereby pushing seal ring 91 downward and opening inlet passages 83. Shoe 93 could be forced downward by placing the second material above the shoe and placing upper displacing shoe 95 above the second material. In this manner, when upper shoe 95 is forced downward, lower shoe 93 and the second material would move downward also. The second material would be forced into the second container through inlet passages 83. If desired, a separate slug of flushing fluid could be forced through the second material in a manner similar to that described for the first nuclear fuel material.

The foregoing has separately described various ways and means for assembling and detonating a nuclear explosive device through a borehole narrower than the nuclear explosive device. Such ways and means may be combined in any suitable manner and as previously mentioned, this invention is limited only by the scope of the claims and ones skilled in this art can readily suggest other means for carrying out this invention without departing herefrom. For example, the nuclear triggering device could be actuated by mechanical motion of the casing or tubing such as reciprocation or rotation, or by hydraulic pressure pulses, or by activating a timer network or the like. Similarly, the invention is not limited to any specific means for expanding the containers nor to any specific material for manufacturing the expansible containers and other elements used in assembling the explosive. Such materials will be designed of low neutron absorption coefficient materials where necessary and of sufficiently rugged materials to ensure operability in the downhole environment.

What is claimed is:

1. In a method for assisting in underground recovery of minerals including hydrocarbons in a subsurface formation through a borehole, the improvement which comprises:
    a. enlarging a section of said borehole adjacent said formation to form a cavity large enough to hold a nuclear explosive device,
    b. measuring the boundaries of said cavity in a manner accurate enough to determine if said cavity will hold said nuclear explosive device and to determine the location for said nuclear explosive device in said cavity,
    c. lowering a nuclear triggering device placed in a first collapsed expansible container through said borehole into said cavity to said location, said first collapsible container being inside a second collapsed expansible container,
    d. thereafter placing a nuclear fuel material in said first container to expand said first container and substantially around said nuclear triggering device with enough of said nuclear fuel material to form said nuclear explosive device, said expanded first container having a lateral cross section greater than the lateral cross section of said borehole,
    e. thereafter placing a second material in said second container to expand said second container and substantially around said first container, and
    f. actuating said nuclear triggering device thereby detonating said nuclear explosive device in said formation.

2. The method of claim 1 wherein heavy water is used to form a flowable slurry with the nuclear fuel material and said nuclear fuel material is placed in the first container around the nuclear triggering device by forcing said slurry into said first container.

3. The method of claim 1 wherein the nuclear fuel material to be placed in the first container contains the deuteride of an active metal substance and is mixed with an anhydrous liquid to form a flowable slurry, and said nuclear fuel material is placed in said first container around the nuclear triggering device by forcing said slurry into said first container.

4. The method of claim 1 wherein the nuclear fuel material contains a heavy hydrogen isotope of the hydroxide of an active metal substance and is mixed with heavy water to form a flowable slurry, and said nuclear fuel material is placed in said first container around the nuclear triggering device by forcing said slurry into said first container.

5. The method of claim 1 wherein the second material has a specific gravity greater than the specific gravity of the nuclear fuel material.

6. The method of claim 5 wherein said second material is a material suitable for being activated by the nuclear triggering device to increase the yield of the nuclear explosive device.

7. The method of claim 5 wherein heavy water is used to form a flowable slurry with the nuclear fuel material and said nuclear fuel material is placed in the first container around the nuclear triggering device by forcing said slurry into said first container.

8. The method of claim 5 wherein the nuclear fuel material to be placed in the first container contains the deuteride of an active metal substance and is mixed with an anhydrous liquid to form a flowable slurry, and said nuclear fuel material is placed in said first container around the nuclear triggering device by forcing said slurry into said first container.

9. The method of claim 5 wherein the nuclear fuel material contains a heavy hydrogen isotope of the hydroxide of an active metal substance and is mixed with heavy water to form a flowable slurry, and said nuclear fuel material is placed in said first container around the nuclear triggering device by forcing said slurry into said first container.

10. The method of claim 6 wherein heavy water is used to form a flowable slurry with the nuclear fuel material and said nuclear fuel material is placed in the first container around the nuclear triggering device by forcing said slurry into said first container.

11. The method of claim 6 wherein the nuclear fuel material to be placed in the first container contains the deuteride of an active metal substance and is mixed with an anhydrous liquid to form a flowable slurry, and said nuclear fuel material is placed in said first container around the nuclear triggering device by forcing said slurry into said first container.

12. The method of claim 6 wherein the nuclear fuel material contains a heavy hydrogen isotope of the hydroxide of an active metal substance and is mixed with heavy water to form a flowable slurry, and said nuclear fuel material is placed in said first container around the nuclear triggering device by forcing said slurry into said first container.

* * * * *

UNITED STATES PATENT OFFICE
CERTIFICATE OF CORRECTION

Patent No. 3,659,649     Dated May 2, 1972

Inventor(s) Henry F. Dunlap

It is certified that error appears in the above-identified patent and that said Letters Patent are hereby corrected as shown below:

Column 9, line 51, "collapsible" should read -- collapsed expansible --.

Signed and sealed this 26th day of September 1972.

(SEAL)
Attest:

EDWARD M. FLETCHER, JR.
Attesting Officer

ROBERT GOTTSCHALK
Commissioner of Patents